(12) United States Patent
Li et al.

(10) Patent No.: US 8,126,273 B2
(45) Date of Patent: Feb. 28, 2012

(54) METHOD FOR RECONSTRUCTING THREE-DIMENSIONAL IMAGES FROM TWO-DIMENSIONAL IMAGE DATA

(75) Inventors: Gang Li, Plainsboro, NJ (US); Yakup Genc, Dayton, NJ (US)

(73) Assignee: Siemens Corporation, Iselin, NJ (US)

( * ) Notice: Subject to any disclaimer, the term of this patent is extended or adjusted under 35 U.S.C. 154(b) by 1024 days.

(21) Appl. No.: 12/045,074

(22) Filed: Mar. 10, 2008

(65) Prior Publication Data

US 2008/0247668 A1    Oct. 9, 2008

Related U.S. Application Data

(60) Provisional application No. 60/910,319, filed on Apr. 5, 2007.

(51) Int. Cl.
*G06K 9/46* (2006.01)
(52) U.S. Cl. ........................................ 382/203; 382/285
(58) Field of Classification Search .................. 382/154, 382/285, 291, 203
See application file for complete search history.

(56) References Cited

U.S. PATENT DOCUMENTS 5,475,422 A * 12/1995 Mori et al. ...................... 348/48
(Continued)

OTHER PUBLICATIONS

Cheung et al., Shape-From-Silhouette of Articulated Objects and its Use for Human Body Kniematics Estimation and Motion Capture, Jun. 18-20, 2003, 2003 IEEE Computer Society Conference on Computer Vision and Pattern Recognition, vol. 1, pages not numbered: 8 pages total.*

(Continued)

*Primary Examiner* — Matthew Bella
*Assistant Examiner* — Dennis Rosario
(74) *Attorney, Agent, or Firm* — Donald B. Paschburg

(57) ABSTRACT

A method for reconstructing three-dimensional, plural views of images from two dimensional image data. The method includes: obtaining two-dimensional, stereo digital data from images of an object; processing the digital data to generate an initial three-dimensional candidate of the object, such process using projective geometric constraints imposed on edge points of the object; refining the initial candidate comprising examining spatial coherency of neighboring edge points along a surface of the candidate.

1 Claim, 2 Drawing Sheets

U.S. PATENT DOCUMENTS

| | | | | |
|---|---|---|---|---|
| 5,574,836 | A * | 11/1996 | Broemmelsiek | 345/427 |
| 6,834,120 | B1 * | 12/2004 | LeClerc et al. | 382/170 |
| 6,975,756 | B1 * | 12/2005 | Slabaugh et al. | 382/154 |
| 7,574,067 | B2 * | 8/2009 | Tu et al. | 382/254 |
| 2005/0059879 | A1 * | 3/2005 | Sutherland et al. | 600/411 |

OTHER PUBLICATIONS

Cheung et al., Shape-From-Silhouette Across Time Part I: Theory and Algorithms, 2005, Springer Science + Business Media, Inc., vol. 62, No. 3, pp. 221-247.*

Cass, Polynomial-Time Geometric Matching for Object Recognition, Jan. 1997, Springer Netherlands, vol. 21, No. 1, pp. 37-61.*

Johnson et al., Recognizing Objects by Matching oriented points, Jun. 17-19, 1997, 1997 IEEE Computer Society Conference on Computer Vision and Pattern Recognition, pp. 684-698.*

Li, et al. "Contour-Based Binocular Stereo: Inferring Coherence in Stereo Tangent Space" Technical Report, Yale U. May 2005; published by Dept. of Computer Science, retrieved from Internet: URL: http://www.cs.yale.edu/publications/techreports/tr1324.pdf; Magazine; 2005; US.

Gang, et al "Toward a differential geometric model for stereo vision: curves and surfaces" Oct. 2006, PhD Thesis, Department of Computer Science, Yale University, New Haven, XP002516906 Retrieved from the Internet: URL:http://portal.acm.org/citation.cfm?id=1269449> Chapters 3, 4, 5 and 6 p. 44.

Gang, et al. "Contextual Inference in Contour-Based Stereo Correspondence" Int'l Journal of Computer Vision, Kluwer Academic Publishers, BO, vol. 69, No. 1; published Apr. 1, 2006, pp. 59-75, 64, 66, 68; Magazine; 2006; US.

Guy, et al.; "Inference of surfaces, 3-D curves and junctions from sparse 3-D data" Computer Vision, 1995 Proceedings. International Symposium on Coral Gables, FL USA Nov. 21-23, 1995; Los Alamitos, CA, US, IEEE Comput. Soc. US; pp. 599-604; Magazine; 1995; US.

Terzopoulos; "The Computation of Visible-Surface Representations" IEEE Transactions on Pattern Analysis and Machine Intelligence, IEEE Svc. Ctr., Los Alamitos, CA, US; vol. 10, No. 4, Jul. 1, 1998; pp. 417, 419, 428 and 434; Magazine; 1988; US.

Li, et al.; "Differential Geometric Consistency Extends Stereo to Curved Surfaces" Computer Vision-ECCV 2006 Lecture Notes in Computer Science; LNCS, Springer, Berlin, DE; vol. 3953, Jan. 1, 2006; pp. 44-57; Magazine; 2006; DE.

Schmid, et al.; "The Geometry and Matching of Curves in Multiple Views" European Conference on Computer Vision, Berlin, DE, vol. 1, Jan. 1, 1998; pp. 394-409, Section 2.2 and 3; Magazine; 1998; DE.

Li, et al; "Multi-View Edged-based Stereo by Incorporating Spatial Coherence" 3-D Digital Imaging and Modeling, 2007. 3DIM '07. Sixth Int'l Conference on IEEE, Piscataway, NJ US; Aug. 1, 2007; pp. 341-348; Magazine; 1998; US.

* cited by examiner

METHOD FOR RECONSTRUCTING THREE-DIMENSIONAL IMAGES FROM TWO-DIMENSIONAL IMAGE DATA

CROSS-REFERENCE TO RELATED APPLICATIONS

This application claims priority from U.S. Provisional application No. 60/910,319 filed Apr. 5, 2007, the entire subject matter thereof being incorporated herein by reference.

TECHNICAL FIELD

This invention relate generally to methods for reconstructing three-dimensional images from two-dimensional image data and more particularly to methods for reconstructing three-dimensional images from two dimensional, stereo-based, image data.

BACKGROUND

As is known in the art, as we live in a three-dimensional (3D) world, we expect our computer vision systems to reason about our 3D environment using two-dimensional (2D) images. One such inference is the reconstruction or modeling of the environment from images captured from multiple known view points (multi-view stereo). The result of such a reconstruction is used for a variety of applications including autonomous navigation, collision avoidance, reverse engineering and entertainment.

The wide variety of application areas presents varying difficulties for the existing multi-view stereo methods. The difficulties include the complexity of the environment to be modeled (e.g., the object geometries and appearances, and the amount of clutter), the number of available images and their field of views (FOVs), the speed of reconstruction, and the level of automation (e.g., full vs. semi-automated modeling).

Scenes without texture but with clutter are traditionally difficult for dense multi-view stereo methods [see S. M. Seitz, B. Curless, J. Diebel, D. Scharstein, and R. Szeliski. A comparison and evaluation of multi-view stereo reconstruction algorithms. In *Proc. IEEE Conference on Computer Vision and Pattern Recognition*, 2006]. Object parts without texture are difficult to recover as no correspondences can be established. Surface boundaries or markings are recovered reliably only at places where appearance information is unambiguous (aperture problem) [see PhotoModeler. http://www.photomodeler.com]. On the other hand, clutter presents additional problems as appearance matching may be overwhelmed [see D. G. Lowe. Distinctive image features from scale-invariant keypoints. *International Journal of Computer Vision*, 60(2): 91-110, 2000].

Feature-based stereo algorithms, in particular, edge-based methods, are better suited for the textureless objects as well as cluttered scenes. Surface boundaries or markings are recovered at every location using prior information. Similarly, clutter is eliminated as the clutter edges do not provide consistent matching [see R. T. Collins. A space-sweep approach to true multi-image matching. In *Proc. IEEE Conference on Computer Vision and Pattern Recognition*, 1996].

The success of the edge-based reconstruction heavily depends on the type and amount of the prior information used about the scene, especially the surface boundary and surface marking edges. The projective geometric constraints (i.e., multi-view image constraints such as epipolar or trifocal geometry) have been used in the past to capture the change of appearance of the edges between different views [see O. Faugeras and L. Robert. What can two images tell us about a third one? *International Journal of Computer Vision*, 18:5-19, 1996 and C. Schmid and A. Zisserman. The geometry and matching of lines and curves over multiple views. *International Journal of Computer Vision*, 40(3): 199-233, 2000].

Multi-view stereo methods can be broadly classified into: (i) Dense stereo algorithms that seek reconstruction of dense object models by exploiting photo-consistency, [see S. M. Seitz, B. Curless, J. Diebel, D. Scharstein, and R. Szeliski. A comparison and evaluation of multi-view stereo reconstruction algorithms. In *Proc. IEEE Conference on Computer Vision and Pattern Recognition*, 2006.] and references therein; and (ii) Feature-based stereo algorithms that recover models of sparse features. Feature-based methods can be further divided into methods that rely on point features such as SIFT [see D. G. Lowe. Distinctive image features from scale-invariant keypoints. *International Journal of Computer Vision*, 60(2):91-110, 2000], and edge-based methods, e.g. [see R. T. Collins. A space-sweep approach to true multi-image matching. In *Proc. IEEE Conference on Computer Vision and Pattern Recognition*, 1996].

Seitz et al. [see S. M. Seitz, B. Curless, J. Diebel, D. Scharstein, and R. Szeliski. A comparison and evaluation of multi-view stereo reconstruction algorithms. In *Proc. IEEE Conference on Computer Vision and Pattern Recognition*, 2006] provide a comparative study of several dense multi-view stereo algorithms.

In the following a brief review some recent work on edge (curve) based reconstruction algorithms is presented:

Collins [see R. T. Collins. A space-sweep approach to true multi-image matching. In *Proc. IEEE Conference on Computer Vision and Pattern Recognition*, 1996] introduce the "space-sweep" (also known as "plane-sweep") method to the stereo matching of edge points in multiple views. The observation is that when each edge point back-projects to space and casts a vote for every possible 3D point (quantized in depth) along the ray, the 3D points that receive enough votes from multiple images are likely to be true 3D scene points and are thus retained as reconstructed results. The algorithm is implemented by sweeping a plane through the volume of space along a line perpendicular to the plane.

Schmid and Zisserman [see C. Schmid and A. Zisserman. Automatic line matching across views. In *Proc. IEEE Conference on Computer Vision and Pattern Recognition*, 1997] study the matching of line segments between images where both intensity information and the geometric relationship induced by epipolar geometry are used. For short range motion they determine the matching score for a pair of line segments based on the average point-wise correlation scores along the line segment. For long range motion such uncorrected correlation scores do not suffice, so they adjust the correlation scores based on a pencil of planes (homographies) and select the best one.

Berthilsson et al. [see R. Berthilsson, K. Astrom, and A. Heyden. Reconstruction of general curves, using factorization and bundle adjustment. *International Journal of Computer Vision*, 41(3): 171-182, 2001] reconstruct general space curves using factorization and bundle adjustment, assuming image edge points are already matched. While Kaminski and Shashua [see J. Y. Kaminski and A. Shashua. Multiple view geometry of general algebraic curves. *International Journal of Computer Vision*, 56(3):195-219, 2004] show how to reconstruct an algebraic curve from multiple views.

Taylor [see C. J. Taylor. Surface reconstruction from feature based stereo. In *Proc. IEEE International Conference on Computer Vision*, 2003] proposes a feature (edge) based stereo algorithm for surface reconstruction by inferring freespace. Kahl and August [see F. Kahl and J. August. Multiview reconstruction of space curves. In *Proc. IEEE International Conference on Computer Vision*, 2003] pose the problem as the coupling of a prior distribution of general space curves and an image model that characterizes the formation of the image curves.

Furukawa et al. [see Y. Furukawa, A. Sethi, J. Ponce, and D. Kriegman. Structure and motion from images of smooth textureless objects. In *Proc. European Conference on Computer Vision*, 2004] address the estimation of a smooth textureless object by utilizing geometrically-consistent frontier points and the redundancy of multiple epipolar geometries to retain the consistent correspondences.

Bay et al. [see H. Bay, V. Ferrari, and L. V. Gool. Wide-baseline stereo matching with line segments. In *Proc. IEEE Conference on Computer Vision and Pattern Recognition*, 2005] study line segment matching in two uncalibrated views of poorly textured images by exploring the sidedness constraint in a triplet of feature matches or a pair of feature matches. The observation is that a feature triplet or pair including a mismatch is more likely to violate the sidedness constraint. Li and Zucker [see G. Li and S. W. Zucker. A differential geometrical model for contour-based stereo correspondence. In *Proc. IEEE Work-shop on Variational, Geometric, and Level Set Methods in Computer Vision (atlCCV '03)*, 2003. and G. Li and S. W. Zucker. Contextual inference in contour-based stereo correspondence. *International Journal of Computer Vision*, 69(1):59-75, 2006] explore contextual inference in two-view stereo using pairwise differential constraints between neighboring matches. Sinha and Pollefeys [see S. N. Sinha and M. Pollefeys. Multi-view reconstruction using photo-consistency and exact silhouette constraints: A maximum-flow formulation. In *Proc. IEEE International Conference on Computer Vision*, 2005] reconstruct a closed continuous surface of an object using both photo-consistency and silhouette consistency. Savadjiev et al. [see P. Savadjiev, J. S. Campbell, G. B. Pike, and K. Siddiqi. 3D curve inference for diffusion MRI regularization and fibre tractography. *MedicalImage Analysis*, 10(5):799-813, 2006] use 3D curve inference for regularizing diffusion MRI data.

Multi-view geometry [see O. Faugeras. *Three-Dimensional Computer Vision*. The MIT Press, 1993 and R. Hartley and A. Zisserman. *Multiple View Geometry in Computer Vision*. Cambridge Univ. Press, 2000] confines the locations of a given scene point in multiple images. We refer to this as the projective geometric constraints which include the epipolar constraints for a pair of cameras, and the trifocal tensor for a triplet of cameras. These constraints form the basis for many multi-view stereo methods. The plane sweep algorithm [see R. T. Collins. A space-sweep approach to true multi-image matching. In *Proc. IEEE Conference on Computer Vision and Pattern Recognition*, 1996], for example, uses the constraint on the image edge point locations in multiple views. Similar constraints on higher order image measurements such as image curvatures across multiple views are also explored [see O. Faugeras and L. Robert. What can two images tell us about a third one? *International Journal of Computer Vision*, 18:5-19, 1996. and C. Schmid and A. Zisserman. The geometry and matching of lines and curves over multiple views. *International Journal of Computer Vision*, 40(3): 199-233, 2000].

SUMMARY

In accordance with the present invention, a method is provided for reconstructing three-dimensional images from two dimensional image data. The method includes: obtaining two-dimensional, plural views of stereo digital data from images of an object; processing the digital data to generate an initial three-dimensional candidate of the object, such process using projective geometric constraints imposed on edge points of the object; refining the initial candidate comprising examining spatial coherency of neighboring edge points along a surface of the candidate.

The images may be obtained from digital cameras, or scanned films or prints, for example.

Thus, besides the projective geometric constraints, the method uses underlying structural relationships between neighboring edge points in 3D. These 3D constraints can be formally characterized by differential geometry, herein sometimes referred to as differential geometric constraints or spatial coherency of neighboring edge points.

Examples of the differential geometric constraints include tangent and curvature continuity capturing first and second order smoothness of the space curve or edge.

In one embodiment, the method incorporates at least the first order differential geometric constraint, i.e., tangent continuity, to the other projective geometric constraints for multi-view stereo reconstruction It is noted that second, or higher order, differentials may be also be included.

In one embodiment, the method uses an algorithm to extend the plane-sweep algorithm by incorporating spatial coherence of the scene. The method uses the geometric consistency derived from the continuity of three-dimensional edge points as a differential geometric constraint in addition to projective geometric constraints. Initial experiments conducted on both synthetic and real data shows that the proposed method successfully recovers the 3D scene structure of space edges even in cluttered environments.

As the number of views increases, the accuracy of reconstruction increases as well. At the same time, matching becomes more complex. Feature-based methods use multiple views, where the coverage, i.e., the field of view (FOV), is potentially larger.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
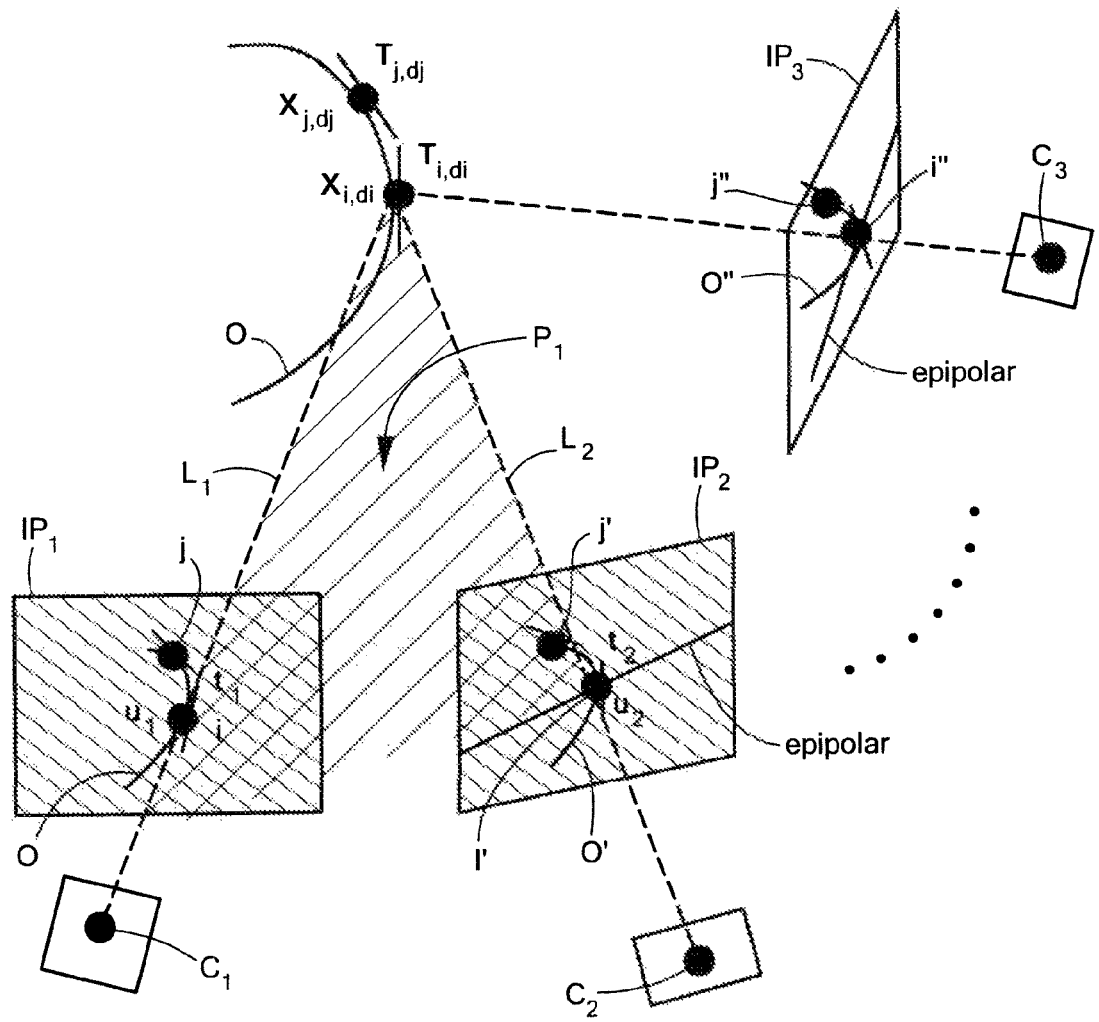
FIG. 1 is a sketch showing a two points on a portion of a surface imaged into image planes of three cameras and geometric relationship used to understand the method according to the invention.

Referring now to FIG. 1, the method uses two sources of geometric constraints in multi-view stereo: (i) The (projective) geometric constraints imposed on the locations of image edge points in multiple images for a given scene point; and (ii) The (differential) geometric constraints imposed by the spatial coherence of neighboring edge points along the structures in 3D. It is noted that an object O is imaged in the focal or image planes $P_1$, $IP_2$ and $IP_3$ of three cameras having centers $C_1$, $C_2$, and $C_3$, respectively as shown. It is noted that two points at positions $X_{j,dj}$ and $X_{i,di}$ on the edge of the object O are imaged: as corresponding points i, j, respectively, in image plane $IP_1$ of a first one of the three camera having its center at $C_1$; as corresponding points i', j', respectively, in image plane $IP_2$ of a second one of the three camera having its center at $C_2$; and as corresponding points i", j", respectively, in image plane $IP_3$ of a third one of the three camera having its center at $C_3$.

It is noted that point i' in image plane $IP_2$, for example, is uniquely identified as a point on the epipolar line in image plane $IP_2$ (i.e., the epipolar line is the line formed by the intersection of a plane $P_1$ having defined by two lines: one line being the line $L_1$ from the center $C_1$ and the point $X_{i,di}$ and the other line $L_2$ from the center $C_2$ and the point $X_{i,di}$). It is also noted that the point i' is uniquely identified on the epipolar line in the image plane $IP_2$ is the point on the epipolar line that intersects the imaged edge on the object, O'. The third camera is used to improve the accuracy since it should be noted that the example in FIG. 1 is for one edge on an object and that in the real word the object will have edges disposed in space.

The process described above is referred to as projective geometric constrains imposed on locations of image edge points in multiple images for a given scene point.

Figure 2:
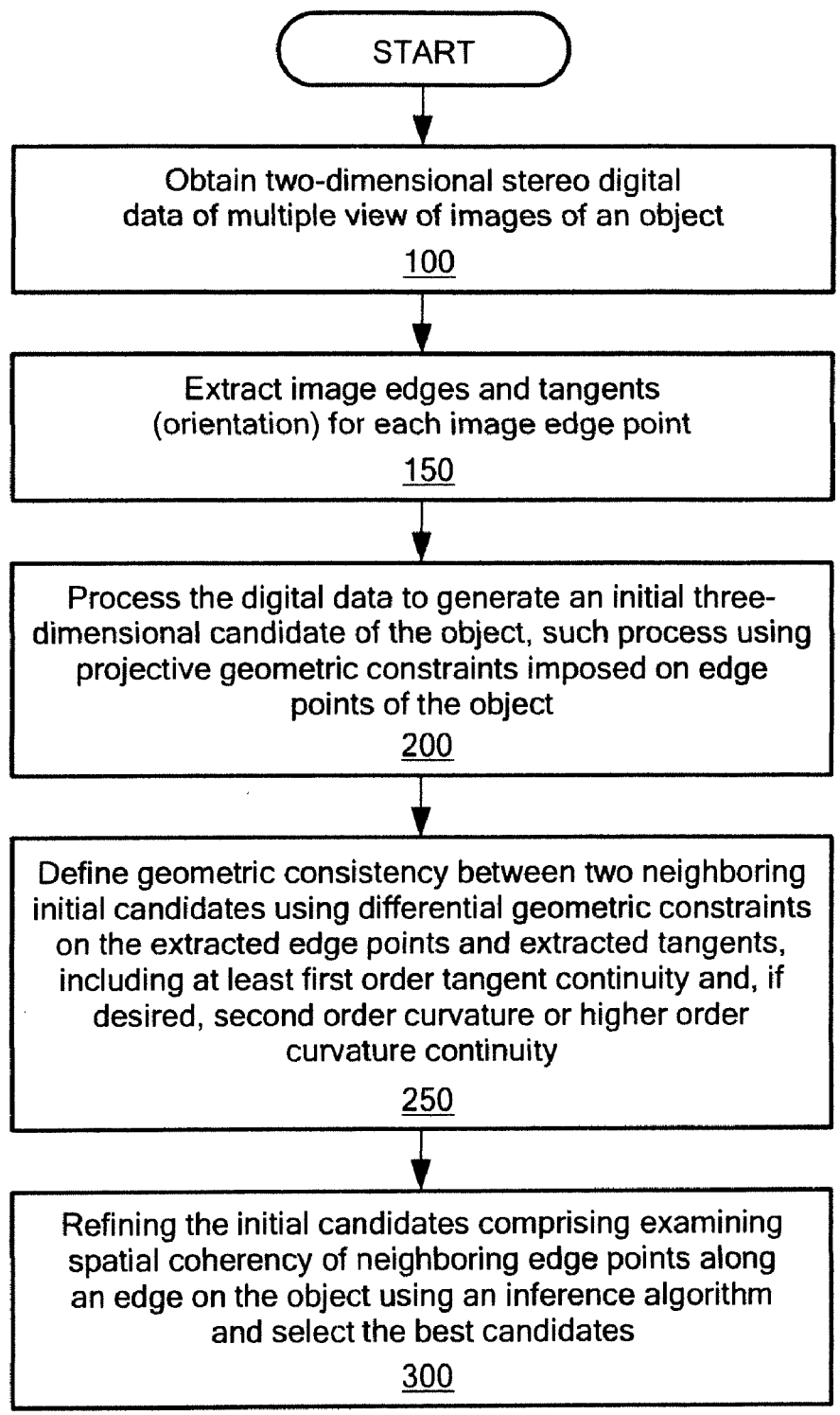
FIG. 2 is a flowchart of the method provided for reconstructing three-dimensional images from two dimensional image data method according to the invention.

It is noted that an initial step in the method according to the invention, as shown by the flowchart in FIG. 2 is to obtain two-dimensional, plural view, stereo digital data from images of an object, Step 100 and the process the digital data to generate an initial three-dimensional candidate of the object using projective geometric constraints imposed on edge points of the object as described in connection with FIG. 1. The images may be obtained in Step 100 from digital cameras, or scanned films or prints, for example.

More particularly, the process extracts image edges and tangents (spatial orientation) from the obtained two-dimensional, plural view, stereo digital data, Step 150.

Next, the process processes the digital data to generate an initial three-dimensional candidate of the object, such process using projective geometric constraints imposed on edge points of the object, Step 200.

Next, the process defines geometric consistency between two neighboring initial candidates using differential geometric constraints on the extracted edge points and extracted tangents, including at least first order tangent continuity and, if desired, second or higher order curvature continuity. Step 250.

Next, the process refines the initial candidates comprising examining spatial coherency of neighboring edge points along an edge on the object using an inference algorithm and select the best candidates, Step 300. Thus, the method supplements or refines the information obtained in Step 200 (an initial candidate) by examining spatial coherency of neighboring edge points along a surface of the candidate.

Thus, besides the projective geometric constraints, the method uses underlying structural relationships between neighboring edge points in 3D. These 3D constraints can be formally characterized by differential geometry, herein sometimes referred to as differential geometric constraints or spatial coherency of neighboring edge points. Examples of the differential geometric constraints include tangent and curvature continuity capturing first and second order smoothness of the space curve.

More particularly, referring again to FIG. 1, Step 300 is based on the observation that there exists underlying structural relationship between neighboring scene points in multi-view stereo yielding additional geometric constraints besides the projective geometric constraints. In order to combine these two, the method builds a graph G=(V, E) on the edge map of the reference image (defined as $IP_1$ in FIG. 1). Every edge pixel in the reference image then becomes a node in G. Edges E in this graph are determined by the spatial neighborhood in the reference image as will be described in more detail below.

Let i and j be two nearby edge pixels in G. We define the geometric consistency between pixel i with depth $d_i$ and pixel j with depth $d_j$ as:

$$r_{ij}(d_i, d_j) = \exp\left(-\frac{\|X_{i,d_i} - X_{j,d_j}\|^2}{2\sigma_D^2}\right)\exp\left(-\frac{\|T_{i,d_i} - T_{j,d_j}\|^2}{2\sigma_T^2}\right) \quad (1)$$

where $X \in R^3$ denotes the position vector field and $T \in R^3$ denotes the tangent vector field, and $\sigma_D$ and $\sigma_T$ control the range of the neighborhood support for position and tangent, respectively. Thus $X_{i,d_i}$ is the position of node i with depth $d_i$, and $T_{i,d_i}$ is the space tangent of node i with depth $d_i$, and similarly for $X_{j,d_j}$ and $T_{j,d_j}$. Note that $r_{ij}$ takes value in the range of (0,1).

If two neighboring image edge pixels (in the reference image) i and j have similar positions ($X_{i,d_i}$ and $X_{j,d_j}$) and tangents ($T_{i,d_i}$ and $T_{j,d_j}$) in 3D, they are geometrically consistent, and consequently have a larger geometric consistency value. This geometric consistency can be used as the compatibility in the well-known inference algorithms such as relaxation labeling [see R. A. Hummel and S. W. Zucker. On the foundations of relaxation labeling processes. *IEEE Transactions on Pattern Analysis and Machine Intelligence*, 5(3):267-287, 1983 or belief propagation [see W. T. Freeman, E. C. Pasztor, and O. T. Carmichael. Learning low-level vision. *International Journal of Computer Vision*, 40(1):25-47, 2000].

In order to determine such geometric consistency, 3D tangent T is needed. Suppose $t_1$ and $t_2$ are the image tangents in two views (measured in $R^3$), and $u_1$ and $u_2$ are the position vectors from camera centers in two views (also in $R^3$), respectively. FIG. 1 also shows these measurements. Then $u_1$ and $t_1$ define a plane which also contains T. Thus T is orthogonal to $(u_1 \times t_1)$. For the same reason T is orthogonal to $(u_2 \times t_2)$. Thus space tangent T can be computed from:

$$T = \pm\frac{(u_1 \times t_1) \times (u_2 \times t_2)}{\|(u_1 \times t_1) \times (u_2 \times t_2)\|} \quad (2)$$

where × denotes vector cross product. The sign can be easily determined by checking the image projection of T and image tangent (e.g., $t_1$). In practice, when more than two views are available, the computed tangents from each pair of views are averaged. This results in a noticeable increase in accuracy of the computed space tangents.

Since the method here, for example, uses the algorithm of Canny [see J. Canny. A computational approach to edge detection. *IEEE Transactions on Pattern Analysis and Machine Intelligence*, 8(6):679-698, 1986.] for edge detection, the image tangents are readily available as the image gradients are explicitly computed. The orientation is quantized in a complete circle. This lets us avoid potential false matches caused by the two sides of the same object.

Once the method establishes such geometric consistency measures $r_{ij}$ between pairs of neighboring points in 3D, contextual information can be explored using standard inference techniques such as, for example, relaxation labeling [see R. A. Hummel and S. W. Zucker. On the foundations of relaxation labeling processes. *IEEE Transactions on Pattern Analysis and Machine Intelligence*, 5(3):267-287, 1983.] or belief propagation [see W. T. Freeman, E. C. Pasztor, and O. T. Carmichael. Learning low-level vision. *International Journal of Computer Vision*, 40(1):25-47, 2000]. These computational inference techniques find consistent structures within a network of hypotheses (i.e., depths) assigned to nodes in a graph by iteratively using local constraints. Here, for example, the method adopts a relaxation labeling approach [see R. A. Hummel and S. W. Zucker. On the foundations of relaxation labeling processes. *IEEE Transactions on Pattern Analysis and Machine Intelligence*, 5(3):267-287, 1983.] due to its simple implementation and larger neighborhood it can consider for considering spatial coherence in each iteration.

The contextual support $s_i^t(d_i)$ is what node i with depth $d_i$ receives from its neighbors at iteration t:

$$s_i^t(d_i) = \sum_{j \in N_i} \sum_{d_j \in \Lambda} r_{ij}(d_i, d_j) p_j^t(d_j) \quad (3)$$

where $N_i$ denotes the set of all the neighboring nodes of i, and $\Lambda$ denotes the set of all possible quantized depths.

The confidence at node i with depth $d_i$ is then iteratively updated with:

$$p_i^{t+1}(d_i) = \frac{p_i^t(d_i) s_i^t(d_i)}{\sum_{\mu \in \Lambda} p_i^t(\mu) s_i^t(\mu)} \quad (4)$$

Such process achieves a globally consistent solution based on the iterative use of local constraints. The local constraints are encoded in the geometric consistency $r_{ij}$ as computed from equation (1).

More particularly:

Step 200 (FIG. 2)—Generating Initial Matches: The process generates an initial candidate matches based on the input edge maps. This is achieved in a similar fashion as in the plane sweep algorithm [see R. T. Collins. A space-sweep approach to true multi-image matching. In *Proc. IEEE Conference on Computer Vision and Pattern Recognition*, 1996.]. Every edge point i in the reference image is back-projected into 3D for a given projective depth $d_i$. The projective depth undergoes a fixed increment and is bounded by a user-specified depth range. Each increment gives us a 3D point hypothesis which is in turn back-projected into the other images to verify whether it has a corresponding edge point. For those hypothesized initial matches (or 3D points) that have enough image support (e.g. ½ of the total number of input images) we consider it as a valid initial match. In practice we implement this step by efficiently searching along the epipolar lines in the other images.

As a result of this initial match generation step, each edge pixel in the reference image may have multiple valid initial matches (i.e. hypothesized 3D points at several depths). Among these, the method needs to find the final matches. The classical plane sweep algorithm [see R. T. Collins. A space-sweep approach to true multi-image matching. In *Proc. IEEE Conference on Computer Vision and Pattern Recognition*, 1996.] performs this step by a threshold on the image support each initial match receives. An alternative approach is to select the best one based on the image support at each match through a winner-take-all step. We have remarked previously that such classical approach only considers observation in a point-wise manner, i.e. no structural information is taken into consideration. In the next step, the process explores spatial coherence in the matching process, which provides crucial cues for a better reconstruction. The process maintains the initial matches as linked lists.

Step 250 (FIG. 2)—Incorporating Spatial Coherence in Multi-View Edge-Based Stereo:

From the previous step, the method obtained the initial matches, now explores spatial coherence of each candidate match so that geometric consistency can be utilized to infer the true 3D structure. Contextual information in computer vision has proved to be very useful in many applications, [see S. Z. Li. *Markov Random Field Modeling in Image Analysis*. Springer-Verlag, 2001], such as stereo reconstruction [see Y. Boykov, O. Veksler, and R. Zabih. Fast approximate energy minimization via graph cuts. *IEEE Transactions on Pattern Analysis and Machine Intelligence*, 23(11): 1222-1239, 2001], edge detection [see P. Parent and S. W. Zucker. Trace inference, curvature consistency, and curve detection. *IEEE Transactions on Pattern Analysis and Machine Intelligence*, 11(8):823-839, 1989], texture and shading analysis, image super-resolution [see W. T. Freeman, E. C. Pasztor, and O. T. Carmichael. Learning low-level vision. *International Journal of Computer Vision*, 40(1):25-47, 2000.], etc. Popular frameworks for such inference include Relaxation Labeling [see R. A. Hummel and S. W. Zucker. On the foundations of relaxation labeling processes. *IEEE Transactions on Pattern Analysis and Machine Intelligence*, 5(3):267-287, 1983.] and Belief Propagation [see W. T. Freeman, E. C. Pasztor, and O. T. Carmichael. Learning low-level vision. *International Journal of Computer Vision*, 40(1):25-47, 2000.]. Here, the process uses relaxation labeling although other approaches can be used as well. In particular, a graph G=(V, E) is built on the edge map of the reference image. Every edge pixel in the reference image is then a node in the graph. Edges E in this graph are determined by the spatial neighborhood in the reference image. The benefit over belief propagation formulation is that a larger neighborhood is utilized for every iteration.

With initial matches at different depths the goal is to find the depth for each node such that the global structure is most consistent. This is achieved by iteratively updating the confidence $p_i(d_i)$ using equation (4) for a particular depth $d_i$ at each node i. $s_i^t(d_i)$ denotes the contextual support node i with depth $d_i$ receives from its neighbors in iteration t. See [see S. Z. Li. *Markov Random Field Modeling in Image Analysis*. Springer-Verlag, 2001, R. A. Hummel and S. W. Zucker. On the foundations of relaxation labeling processes. *IEEE Transactions on Pattern Analysis and Machine Intelligence*, 5(3): 267-287, 1983.] for more implementation details.

Step 300 (FIG. 2)—Final Reconstruction: After the relaxation labeling process converges (usually the method uses a preset number of iterations, e.g. 10), and selects the depth for each node i using a winner-take-all approach based on the current confidence $p_i$ yielding the estimate as the reconstructed depth for this node:

$$d_i = \underset{d \in \Lambda}{\arg\max}(p_i(d)) \quad (5)$$

Step 4—Bundle Adjustment: An (optional) bundle adjustment [see R. Hartley and A. Zisserman. *Multiple View Geometry in Computer Vision*. Cambridge Univ. Press, 2000.] step is performed.

A number of embodiments of the invention have been described. Nevertheless, it will be understood that various modifications may be made without departing from the spirit and scope of the invention. Accordingly, other embodiments are within the scope of the following claims.

What is claimed is:

1. A method for reconstructing three-dimensional images from two dimensional image data, comprising:

obtaining two-dimensional, plural view, stereo digital data from images of an object;

extracting image edges and tangents from the obtained two-dimensional, plural view, stereo digital data;

processing the digital data to generate an initial three-dimensional candidate of the object, such process using projective geometric constraints imposed on edge points of the object;

defining geometric consistency between two neighboring initial candidates using differential geometric constraints on the extracted edge points and extracted tangents, including at least first order tangent continuity and, if desired, second or higher order curvature continuity;

refining the initial candidates comprising examining spatial coherency of neighboring edge points along an edge on the object using an inference algorithm and selecting a new candidate.

* * * * *